(12) United States Patent
Veness et al.

(10) Patent No.: US 9,137,968 B2
(45) Date of Patent: Sep. 22, 2015

(54) WATERING DEVICE FOR ANIMALS

(76) Inventors: David R. Veness, Forth Worth, TX (US);
Steven Green, Allen, TX (US)

( * ) Notice: Subject to any disclaimer, the term of this patent is extended or adjusted under 35 U.S.C. 154(b) by 975 days.

(21) Appl. No.: 13/189,067

(22) Filed: Jul. 22, 2011

(65) Prior Publication Data

US 2012/0017839 A1    Jan. 26, 2012

Related U.S. Application Data

(60) Provisional application No. 61/366,870, filed on Jul. 22, 2010.

(51) Int. Cl.
*A01K 7/02* (2006.01)
*A01K 7/00* (2006.01)

(52) U.S. Cl.
CPC . *A01K 7/005* (2013.01); *A01K 7/00* (2013.01); *A01K 7/02* (2013.01)

(58) Field of Classification Search
USPC .......................... 119/72, 72.5, 74, 75, 76, 81
See application file for complete search history.

(56) References Cited

U.S. PATENT DOCUMENTS

| | | | | |
|---|---|---|---|---|
| 3,921,584 | A * | 11/1975 | Scantlin | 119/249 |
| 4,239,449 | A * | 12/1980 | Bauer | 415/73 |
| 5,097,795 | A * | 3/1992 | Adey | 119/262 |
| 5,501,178 | A * | 3/1996 | Kemp | 119/74 |
| 6,055,934 | A * | 5/2000 | Burns et al. | 119/74 |
| 6,622,657 | B2 * | 9/2003 | Northrop et al. | 119/74 |
| 7,089,881 | B2 * | 8/2006 | Plante | 119/74 |
| 8,171,885 | B1 * | 5/2012 | Northrop et al. | 119/74 |
| 8,261,696 | B1 * | 9/2012 | Lipscomb et al. | 119/74 |
| 8,381,685 | B2 * | 2/2013 | Lipscomb et al. | 119/74 |
| 8,763,557 | B2 * | 7/2014 | Lipscomb et al. | 119/74 |
| 2008/0190374 | A1 * | 8/2008 | Farris | 119/74 |
| 2008/0257272 | A1 * | 10/2008 | Bolda | 119/72 |

FOREIGN PATENT DOCUMENTS

JP      5-30878    * 2/1993

* cited by examiner

*Primary Examiner* — David Parsley
(74) *Attorney, Agent, or Firm* — Global IP Counselors, LLP

(57) ABSTRACT

A watering device for animals with continuously flowing water to attract the attention of the animal utilizes a water screw device within the watering device to move water from a lower bowl of the device to an upper bowl to create flowing water. The water screw is configured such that the electrical components of the water screw remain separated from the water of the watering dish to remove the possibility of electrocution of the water. Rather, only the mechanical components of the water screw device contact the water of the watering device while the electrical motor of the water screw remains safely out of the water.

17 Claims, 16 Drawing Sheets

WATERING DEVICE FOR ANIMALS

CROSS REFERENCE TO RELATED APPLICATIONS

This application claims the benefit of U.S. Provisional Application No. 61/366,870 entitled, "Watering Device for Animals with Multiple Bowls," which was filed on Jul. 22, 2010 and is incorporated by reference in its entirety.

TECHNICAL FIELD

The present invention relates generally to animal watering devices, and more particularly to a continuous watering device for pets whereby water is circulated using a water screw device to provide continuous running water without the need of a submersible pump.

BACKGROUND

Many animal watering devices include mechanisms to create continuous flowing water within the watering device to attract animals to the water and to help reduce the amount of bacteria or other impurities that may otherwise grow in stagnant water. Generally, to create a continuous flow within an animal watering device, many such devices utilize a submersible pump device that pumps the water to an elevated platform or container. As the elevated container is filled with water, a ramp or waterfall-type structure returns the water back to the pump for re-circulation to the elevated platform. In this manner, continuously flowing water is created within the watering device.

The submersible pumps used in such watering devices require that the pump be at least partially submerged within the water of the watering device for the pumping action to occur. However, despite being water sealed, submersible pumps used to create flowing water within a watering device also pose an electrocution hazard, as electrical components of the pump are surrounded by the water that is ultimately consumed by the animal. This is especially relevant for submersible pumps whose seals may have degraded over time. Further, submersible pumps are also in danger of water damage, as the seals may wear over time. Thus, watering devices that utilize submersible pumps to circulate water within the device potentially create a dangerous electrocution hazard for any animal that drinks from such a watering device, as well as reduce the durability of the continuous flow feature of the device.

BRIEF SUMMARY

One embodiment of the present disclosure may take the form of a continuous watering device for animals. The watering device may comprise a lower bowl for holding water wherein at least a portion of the lower bowl is open to allow an animal to drink the water and an upper bowl configured to hold water above the lower bowl. The watering device may also comprise a ramp disposed between the upper bowl and the lower bowl and configured to support a stream of water as the water moves from the upper bowl to the lower bowl and a water screw assembly for transporting water from the lower bowl to the upper bowl.

Another embodiment of the present disclosure may take the form of a method for providing a continuous flow within an animal watering device. The method may comprise the operations of pouring water into a lower bowl of the watering device, the lower bowl comprising a front container and a rear container and activating a water screw assembly to lift the water from the lower bowl and deposit the water into an upper bowl, with the water screw assembly may comprising a motor operably attached to a water screw. The method may also include the operations filling the upper bowl to a predetermined height and returning the water in the upper bowl on a ramp disposed between the upper bowl and the front container of the lower bowl.

Yet another embodiment of the present disclosure may take the form of a system for a continuously flowing watering device with minimal electrocution hazard. The system may comprise a lower bowl configured to hold water, an upper bowl also configured to hold water to a predetermined height and a water screw assembly disposed between the lower bowl and the upper bowl. The water screw assembly may comprise a motor operably attached to a water screw such that activation of the motor causes the water screw to rotate and transport water from the lower bowl to the upper bowl, wherein the motor is disposed above the predetermined height to minimize the electrocution hazard of the watering device. The system may also include a ramp disposed between the upper bowl and the lower bowl and configured to support a stream of water as the water moves from the upper bowl to the lower bowl.

A further embodiment of the present disclosure may take the form of a watering device for animals having a lower bowl for holding water and a case operably attached above the lower bowl. The case includes an upper bowl fluidly connected to the lower bowl, a first ramp fluidly connected to the upper bowl and a first basin located at a first end of the first ramp. A second ramp is fluidly connected to the first basin and the second ramp is located beneath the first basin. A second basin is located at a first end of the second ramp, and the second basin is located partially beneath the first basin and the second basin is fluidly connected to the first basin and the lower bowl. The watering device also includes a water screw for transporting water from the lower bowl to the upper bowl. The water screw is operably attached to a motor and activation of the motor causes rotation of the water screw within the water screw assembly and transports water from the lower bowl to the upper bowl.

DETAILED DESCRIPTION

One embodiment of the present disclosure may take the form of a watering device for animals with continuously flowing water to attract the attention of the animal. To create flowing water, a water screw device may be utilized within the watering device to move water from a lower bowl of the device to an upper bowl. The water screw may be configured such that the electrical components of the water screw remain separated from the water of the watering dish to remove the possibility of electrocution of the water. Rather, only the mechanical components of the water screw device may contact the water of the watering device while the electrical motor of the water screw remains safely out of the water. A ramp may also be provided such that the water is allowed to flow from the upper bowl to the lower bowl, creating a continuous water flow within the watering device.

In another embodiment, the watering device may include a case attached to a lower bowl, the case may include multiple water pooling locations or basins and ramps to transport the water to each location. The pooling locations provide multiple drinking areas for animals using the watering device. The water screw pulls water from the lower bowl into the upper bowl. The upper bowl may include multiple apertures allowing the water to flow in a variety of directions. The water then may flow from one pooling area or basin into another, until the water reaches the lower portion of the case. The lower portion of the case includes an aperture, that when the case is placed on top of the lower bowl, provides access to the lower bowl. In this embodiment, the animal may drink from a variety of locations, which also allows for multiple animals to drink from the watering device concurrently while additionally providing an aesthetic element to the watering device.

In this manner, a continuous flow is achieved within the watering device without the need for a submersible water pump that lies in the water of the dish, potentially creating an electrocution hazard to any animal using the watering device. Additionally, as the motor for the screw is removed from the water, it substantially prevents heat from being transmitted to the water stored in the device. This is beneficial as many animals, such as cats and dogs, prefer cold water. One or more filters may also be included within the watering device to prevent or degrade any germs or bacteria growing within the water of the watering device so as to further protect the health of any animal using the watering device.

Figure 1:
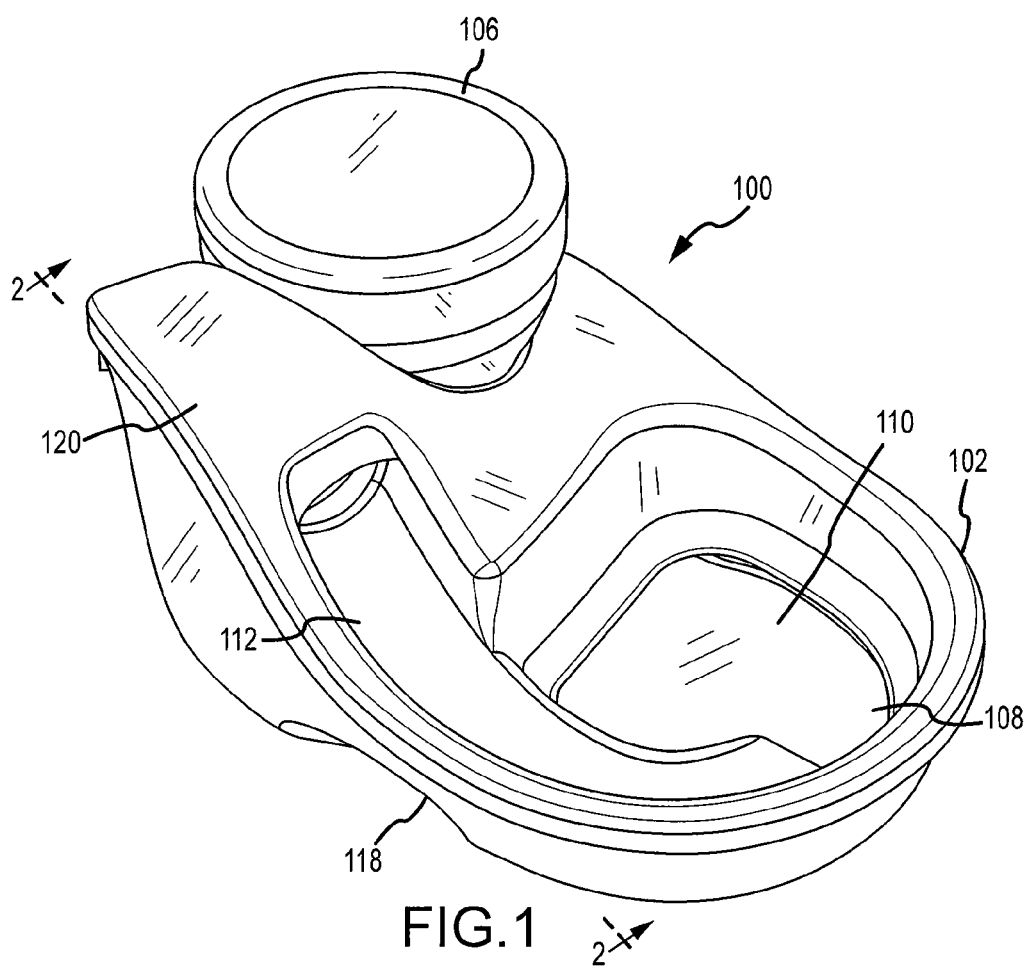
FIG. 1 depicts a perspective view of one embodiment of a watering device utilizing a water screw to create a continuous flow.
Figure 2:
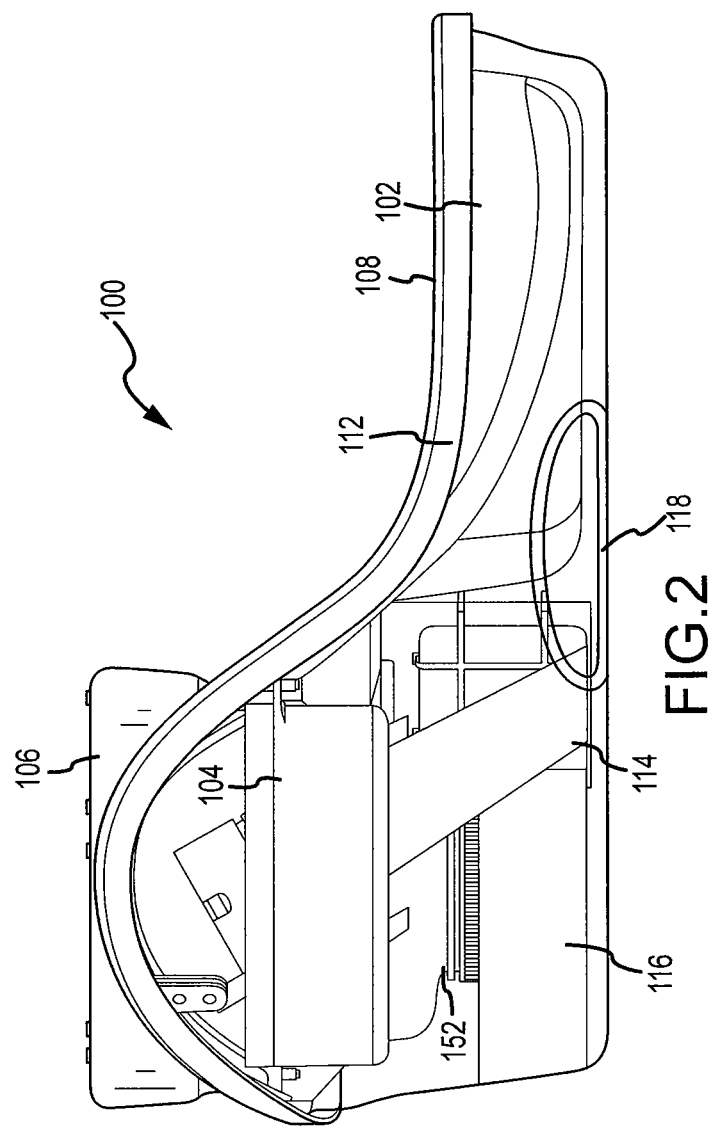
FIG. 2 depicts a cross-sectional view along line 2-2 showing the interior of the watering device utilizing a water screw to create a continuous flow.

Referring first to the embodiment shown in FIGS. 1 and 2, continuous watering device 100 may generally comprise a lower bowl 102, an upper bowl 104, a water screw assembly 114 and a ramp 112. Taken together, lower bowl 102, water screw assembly 114, upper bowl 104 and ramp 112 may form an automatic watering device for animals that continually pumps and circulates water within the watering device. As described in more detail below, the water screw assembly 114 may move water from the lower bowl 102 of the device 100 to the upper bowl 104 to a predetermined height where the water flows onto the ramp 112 and returns to the lower bowl 102 for re-circulation. This continual movement of the water between the upper bowl 104 and the lower bowl 102 may attract pets to the watering device 100, as well as reduce the growth of bacteria and fungus within the water contained therein. In addition, a water storage reservoir 106 may also be included in the watering device 100 to allow easy refill of the watering device and reduce the number of times the watering device may need refilled.

More particularly, the embodiment of the lower bowl 102 shown in FIG. 1 may comprise a front container 108 and a rear container 116. The front container 108 may be generally circular in shape and include sidewalls to hold water, similar to a traditional pet watering bowl or dish. One or more openings 110 or slots may be located in the bottom of the front container 108 to allow water to flow freely from the front container to the rear container 116 of the lower bowl 102. The front container may also include a ramp 112 that carries water from an upper bowl 104 to the front container 108 of the lower bowl 102 during operation of the watering device 100. More particularly, the lower portion of ramp 112 may terminate in the front portion of the front container 108 such that water flowing on the ramp is deposited into the front container of the lower bowl 102. Ramp 112 may slope upward from the front portion of the front container 108 generally toward the rear of the watering device 100, following the circular contour of the front container 108 such that the top portion of the ramp 112 is in communication with the exit spout of the upper bowl 104. The ramp 112 and operation of the watering device 100 are described in more detail below with reference to FIGS. 5 and 6. The remaining portions of the front container 108 may be enclosed to protect the components of the watering device 100 housed therein.

Referring now to FIG. 2, the rear container 116 of the lower bowl 102 may be generally circular in shape and form the base of the watering device 100. The rear container 116 may also include sidewalls to hold and direct the water of the device 100 near the water screw assembly 114 such that the water may be lifted from the lower bowl 102 to the upper bowl 104 for circulation of the water. As mentioned above, one or more openings 110 may be located in the bottom of the front container 108 such that water may flow freely from the front container and into the rear container 116. In this manner, water that flows from the upper bowl 104 and into the front container 108 utilizing the ramp 112 during operation may then pass through the openings 110 into the rear container 116 of the lower bowl 102. In addition, one or more filters or strainers may be placed over opening 110 so as to prevent debris, such as pet hair or dirt, from entering the rear container 116 as the water flows between the containers. In one embodiment, the rear container 116 may be at least partially enclosed to prevent an animal from drinking from the rear container or interacting with the water screw assembly 114.

The outside surface of the lower bowl 102 may include a pair of carrying handles 118. While only one handle 118 can be seen in FIGS. 1 and 2, a second handle may be located on the opposite in mirror image of the first handle. In the embodiment shown, handle 118 is a circular cut-out of the bottom of the lower bowl 102 to provide a surface for an owner of the watering device 100 to lift the device.

Figure 3:
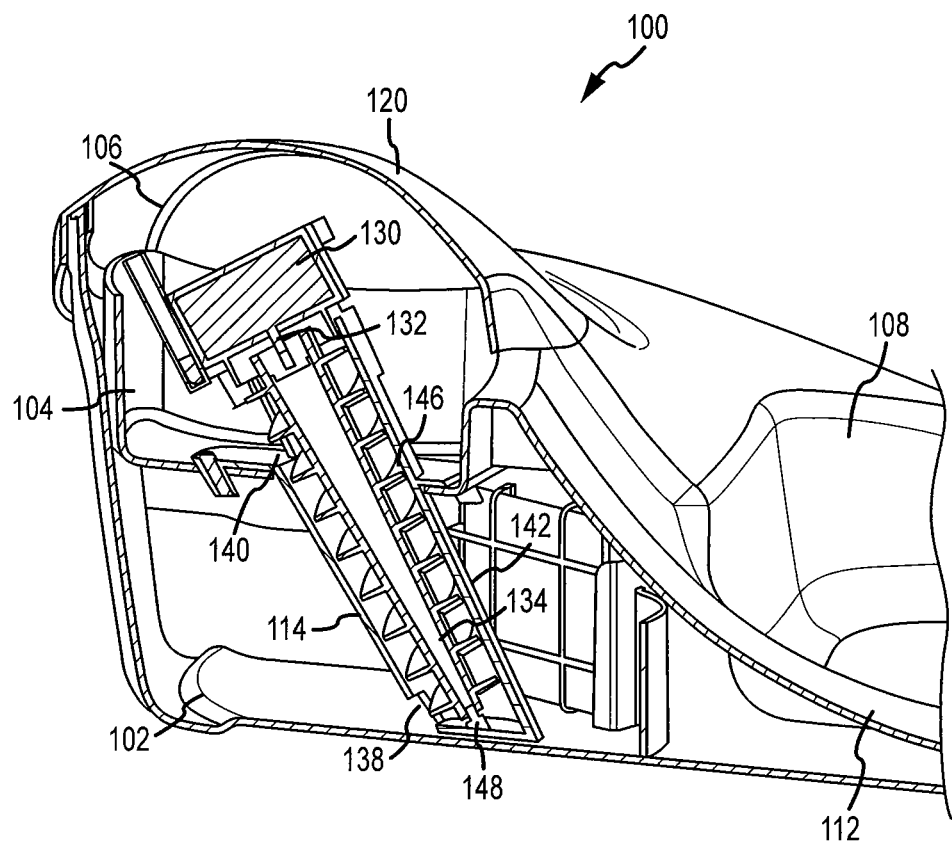
FIG. 3 depicts a cross-sectional view showing the interior of the watering device and the interior of a water screw device to create a continuous flow of water.

FIG. 3 depicts a cross-sectional view of the watering device 100 showing the interior of the watering device and the interior of the water screw device 114 utilized to lift water from the lower bowl 102 to the upper bowl 104 during operation of the device. As mentioned above, the water screw assembly 114 may operate to lift water contained in the lower bowl 102 and deposit the water in the upper bowl 104. As the water screw assembly 114 operates to lift water from the lower bowl 102 to the upper bowl 104, the upper bowl 104 fills to a predetermined height, at which point the water flows out of the upper bowl 104 and onto the ramp 112 and back into the lower bowl 102 for re-circulation. In this manner, the watering device may utilize the water screw assembly 114 and upper and lower bowls to create a continuously flowing watering device 100.

As shown in FIG. 3, water screw assembly 114 is generally tubular in shape and is generally vertically positioned within the watering device 100 between the lower bowl 102 and the upper bowl 104. In one embodiment, the water screw assembly 114 is positioned at a slight angle toward the back of the watering device 100 to aid the lifting of water from the lower bowl 102 to the upper bowl 104 and to provide the device with a lower profile. The water screw assembly 114 generally comprises a motor 130, a drive shaft 132, a water screw 134, a hollow body 142, a lower opening 138 and an upper opening 140. These components generally operate together to carry water entering at the bottom of the assembly 114 up through the hollow body 142 and exiting out at the top of the assembly. In addition, the water screw assembly 114 may be constructed such that the motor 130 and other electrical components of the water screw assembly do not come into contact the water of the watering device 100, thereby reducing the possibility of electrocution to an animal using the watering device.

Figure 4:
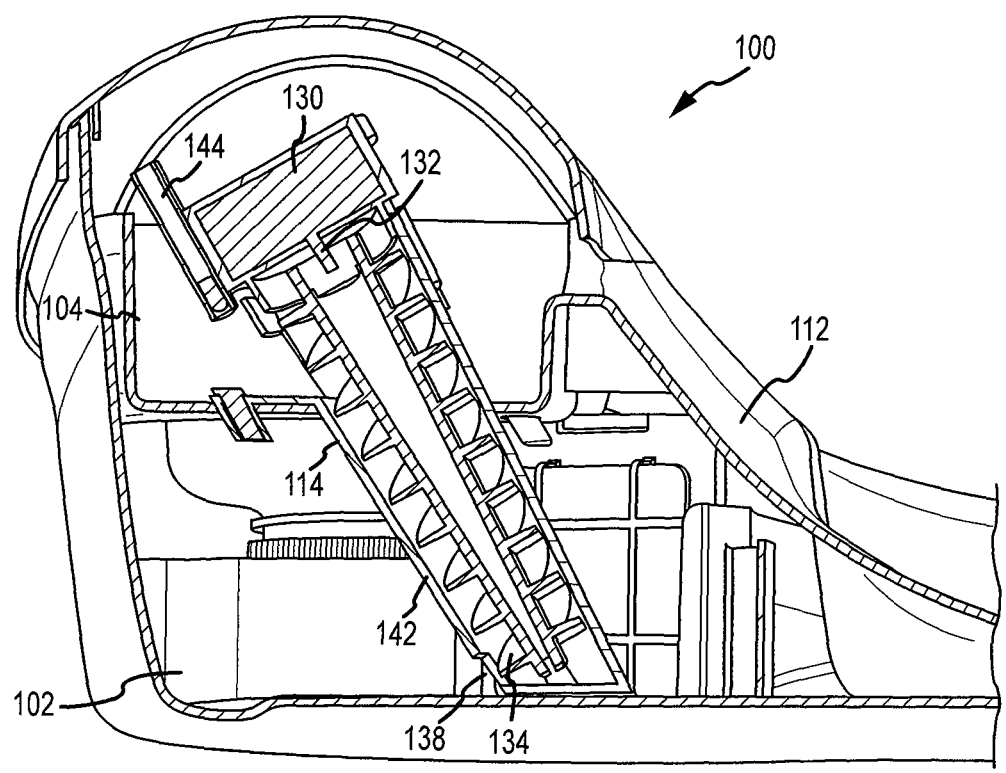
FIG. 4 depicts a magnified view of the cross-sectional view of the embodiment shown in FIG. 3 illustrating the interior of the watering device and the interior of the water screw device to create a continuous flow of water.

As shown in FIGS. 3 and 4, the main structure of the water screw assembly 114 may comprise a hollow body 142 that is generally cylindrical in shape and enclosed on both ends of the cylinder. The hollow body 142 may comprise the overall shape of the water screw assembly such that the water screw assembly is generally self-contained and sealed. However, in one embodiment, the water screw assembly 114 may also include a lower opening 138 and an upper opening 140 that allow for water to enter and exit the water screw assembly, respectively during operation of the water screw. In addition, the lower end of the hollow body 142 may be angled such that the water screw assembly 114 may be positioned flat against the bottom surface of the bottom bowl 102 of the watering device 100 when installed.

Further, the water screw assembly 114 may include a motor 130 attached near the upper portion of the hollow body 142. In one embodiment, the motor 130 may be encased within the water screw assembly 114 while in other embodiments, the motor may be attached to the top of the hollow body 142 of the assembly. The motor 130 may be a typical low power motor powered by either household A.C. electricity or batteries. In the embodiment where the motor is powered by household electricity, power may be supplied to the motor 130 via a power cord (not shown). During operation of the device, the motor 130 may rotate a drive shaft 132 extending from the motor at various speeds in a clockwise manner. In one embodiment, the drive shaft 132 may be a silicon hexagonal key that is operatively connected to a screw 134 located within the hollow body 142 such that the rotation of the drive shaft by the motor causes the water screw to similarly rotate within the hollow body of the water screw assembly 114.

The water screw 134 of the water screw assembly 114 may comprise a helical ridge 146, referred to herein as a thread, wrapped around a center cylinder. In one embodiment, the water screw 134 may include four such threads, each with a 50 degree pitch that each wrap around the center cylinder. However, any number of threads 146 may be included in the water screw. In general, the water screw 134 is similar in width to the interior width of the hollow body 142 such that there is little or no space between the threads and the interior surface of the hollow body. However, it is not required that the contact surface between the threads 146 and the interior surface of the hollow body 142 be water-tight. Rather, some space may be present to allow the water screw 134 to rotate within the hollow body 142 without creating damaging friction between the threads 146 and the interior surface. Therefore, during operation of the water screw assembly 114, some water may leak between the threads 146 and the interior wall of the hollow body 142.

The water screw assembly 114 may also include a screw guide post 148 that projects from the bottom of the assembly within the hollow body 142 and operably connects to the center cylinder of the water screw 134 at the bottom of the screw. The screw guide post 148 may be cylindrical in shape such that the screw 134 is allowed to rotate around the guide post freely while also being supported in place within the hollow body 142 during operation of the water screw 114.

Figure 5:
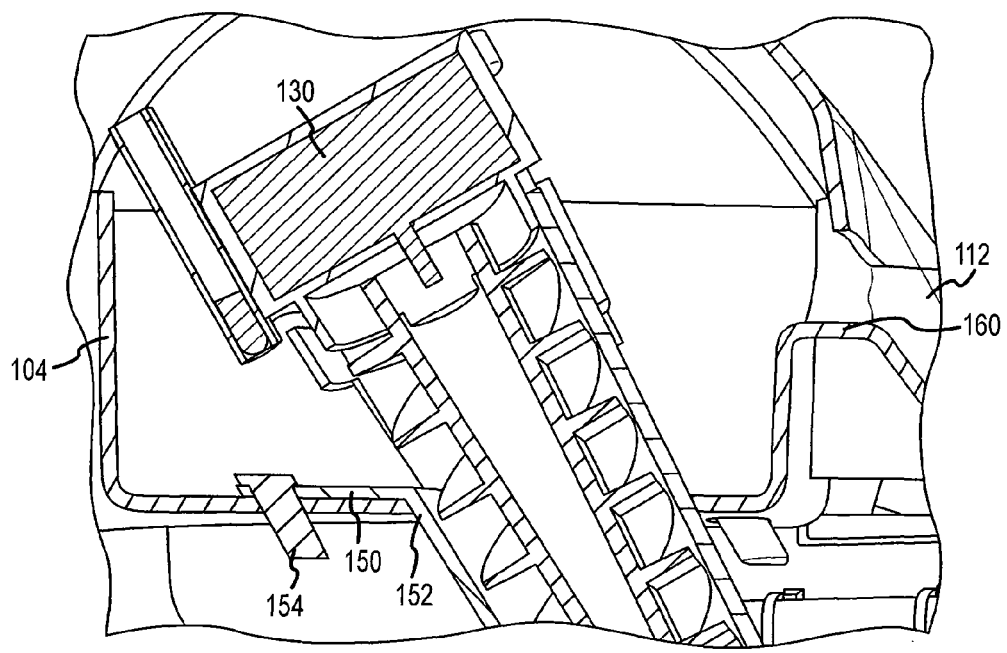
FIG. 5 depicts a magnified view of the cross-sectional view of the embodiment shown in FIG. 4 illustrating the upper bowl and the interior of the water screw device of the watering device.

In the embodiment shown in FIGS. 3 through 5, the water screw assembly 114 may be positioned at an angle within the watering device 100 between the lower bowl 102 and the upper bowl 104. More particularly, the water screw assembly 114 may rest on and extend from the bottom surface of the bottom bowl 102 at an angle toward the rear of the watering device. Further, the water screw assembly 114 may extend through a guide hole 152 located in the bottom surface of the upper bowl 104 and held in place through the use of a flange 150 and one or more fasteners 154 that engage the bottom surface of the upper bowl. More particularly, the flange 150 may extend from the outer surface of the water screw assembly 114 to hold the water screw assembly in place through the guide hole 152 of the upper bowl 104 and resting on the bottom of the bottom bowl 102. The flange 150 may include one or more fasteners 154 that attach to the bottom surface of the upper bowl 104 through one or more corresponding holes within the bottom surface. In one embodiment, the fasteners 154 may comprise a plastic rivet that is tapered on one end to engage a corresponding hole and hold the flange against the bottom surface of the upper bowl 104. However, the fastener 154 may be any type of fastener known or hereby developed. In one embodiment, a gasket may also be placed between the flange 150 and the bottom surface of the upper bowl 104 to create a water-tight seal around the water screw assembly 114 such that water deposited in the upper bowl 104 by the water screw 114 during operation does not leak through the guide hole 152.

Returning to FIG. 1, the watering device 100 may also include a water storage reservoir 106 to provide a constant supply of water to the lower bowl 102 in order to reduce the frequency in which the owner must add water to the watering device. To refill the watering device 100, a user may fill the water storage reservoir 106 by removing the lid and pouring water into the reservoir. As shown in FIG. 2, the reservoir may include a spout 152 at the bottom of the reservoir such that water may flow from the reservoir into the lower bowl 102 as needed by the watering device 100. For example, the spout 152 may include a valve assembly to regulate water flowing from the reservoir 106 into the lower bowl 102 to maintain a minimum water level in the lower bowl 102 so that water may be lifted by the water screw 114 into the upper bowl 104.

Also shown in FIG. 1, a removable lid 120 may be placed over the upper bowl 104 and water screw assembly 114 to protect the components of the watering device 100, as well provide an aesthetic quality to the watering device.

Returning to FIGS. 3 through 5, the watering device operates as follows. Initially, water may be placed in the lower bowl 102, such as by filling the water storage reservoir 106 or by placing water in the lower bowl 102 directly through the front container 108. As the lower bowl 102 fills, water may enter the hollow body 142 of the water screw assembly 114 through the lower opening 138. Upon activation of the motor 130 of the water screw assembly 114, the water screw 134 within the hollow body 142 may begin to rotate, thereby spinning the threads 146 of the water screw, causing the water entering at the bottom of the water screw assembly 114 to be scooped up by the threads 146 as the screw is rotated. The water may be then carried through the hollow body 142 of the water screw assembly 114 by the threads 134 until the water is allowed to flow out of the water screw assembly through the upper opening 140 and into the upper bowl 104. In this manner, water is continuously carried by the water screw 114 from the lower bowl 102 and deposited in the upper bowl 104.

Figure 6:
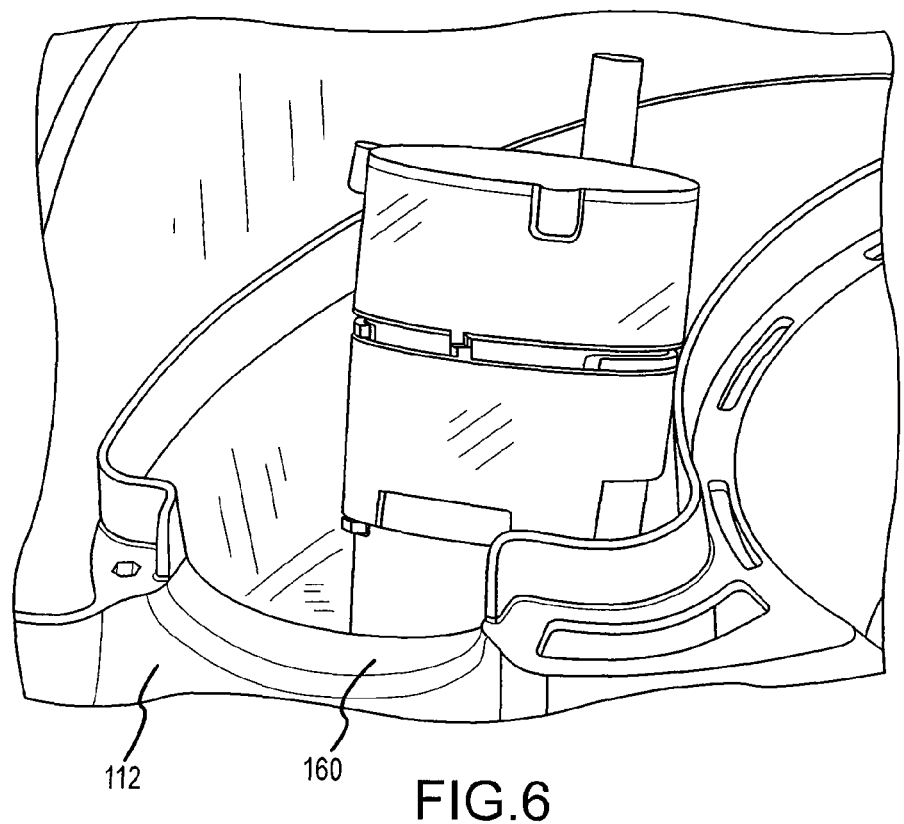
FIG. 6 depicts a perspective view of the interior view of one embodiment of the watering device illustrating the upper bowl and ramp that carries the water from the upper bowl to the lower bowl of the device.

As shown in FIG. 5, the upper bowl 104 may fill with water to a level defined by a curved lip 160 located at one end of the upper bowl. For example, as shown in FIG. 6, the upper bowl 104 includes a curved lip 160 that engages the upper portion of the ramp 112 described above. The ramp 12 may be designed to support water as it flows from the upper bowl 104 to the lower bowl 102. The surface of ramp 112 may have a smooth finish to reduce splashing and turbulent flow of water as it slides down the surface. Lip 160, located at one end of the upper bowl 160 and engaging the top portion of ramp 112, forms a semi-circular channel with a predetermined radius to direct water toward ramp. Lip 160 may comprise a rounded edge to promote smooth water flow as the water stream transitions from upper bowl 104 onto ramp 112. In one embodiment, ramp 112 has a parabolic shape to minimize splashing as the water flows on ramp. Ramp 112 can also, however, be linear, circular, or any other shape that is capable of supporting the water as it flows from upper bowl 104 to the forward container 108 of the lower bowl 102.

Once the upper bowl 104 has filled to a predetermined level defined by the curved lip 160, the water may pass over the lip 160 and down the ramp 112, flowing to the lower bowl 102 to be re-circulated back through the water screw 114. In this manner, a continuous flow of water is achieved as water flows up through the water screw 114, to the upper bowl 104 and down the ramp 112 back to the lower bowl 102.

As should be appreciated, the electrical components of the water screw assembly 114 described in FIGS. 1-5 do not contact the water of the watering device 100. Rather, as shown in FIG. 5, the motor 130 and other electrical components remains above the water-level of the upper bowl 104 such that no electrical components are submerged within the water. By utilizing the mechanical nature of the water screw 134, a continuous flow of water may be achieved while the electrical components of the watering device 100 remain isolated from the water. In this manner, the possibility of the electrical components of the device energizing the water through a short or degraded water seal and causing a electrocution hazard to an animal using the watering device is reduced. Furthermore, because the electrical components are isolated from the water, the heat produced from their operation is not transmitted to the water. This helps to prevent the water from warming, which may be beneficial as many animals, for instance cats and dogs, prefer to drink cold water over warm water.

Figure 7:
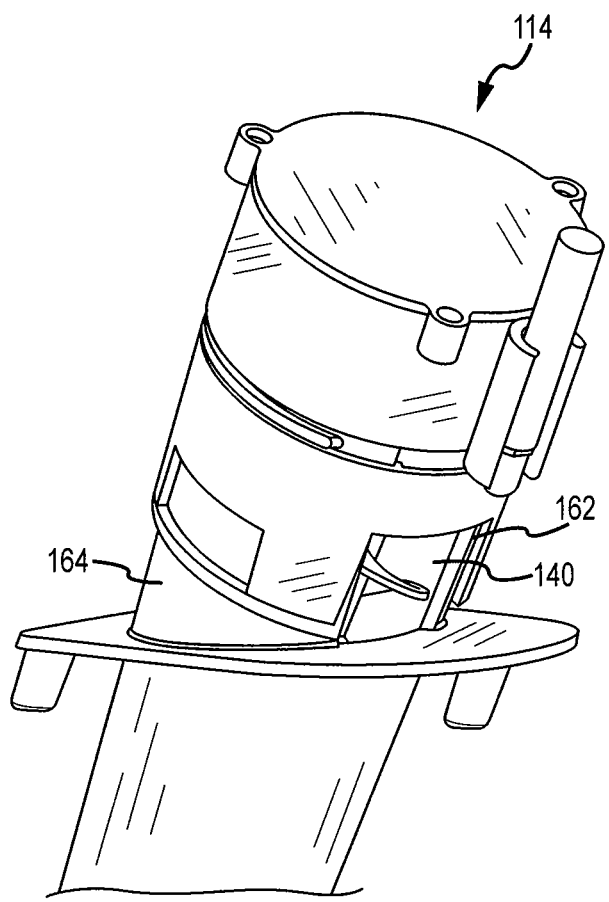
FIG. 7 depicts a perspective view of one embodiment of the water screw device illustrating the adjustable opening at the top opening of the water screw.

The water screw assembly 114 may include several other features. For example, in the embodiment shown in FIG. 7, a flow control device 162 may be configured around the upper opening 140 of the water screw assembly 114 such that a user may rotate the flow control device to adjust the flow of the water flowing out of the water screw assembly. The flow control device 162 may comprise a ring that fits around the outer surface of the water screw assembly 114. A plurality of rectangular cutouts 164 with varying heights may be located around the ring. The flow control device 162 may be slid over the water screw assembly 114 such that one of the rectangular cutouts 164 aligns with the upper opening 140 to allow water to flow through both the upper opening and the rectangular cutout as it exits the water screw assembly.

To control the flow of water out of the assembly, a user may rotate the flow control device 162 around the water screw assembly 114 such that a separate cutout 164 with a different height may be aligned with the upper opening 140. For example, a cutout 164 with a lower height may limit the amount of water that may flow through the upper opening 140 compared to a cutout with a higher height. Thus, by rotating the flow control device 162 and aligning one of the plurality of rectangular cutouts 164 with the upper opening 140, the flow of water from the upper opening may be adjusted. Additionally, one or more nubs (not shown) may be located on the inner surface of the flow control device 162. These nubs may interact with one or more grooves located along the outer surface of the water screw assembly 114 to ensure proper alignment of the rectangular cutouts 164 with the upper opening 140. Thus, to align one of the cutouts 164 over the upper opening 140, a user may rotate the flow control device 162 until the nub engages the one or more grooves and a desired flow height is positioned over the upper opening.

Figure 8:
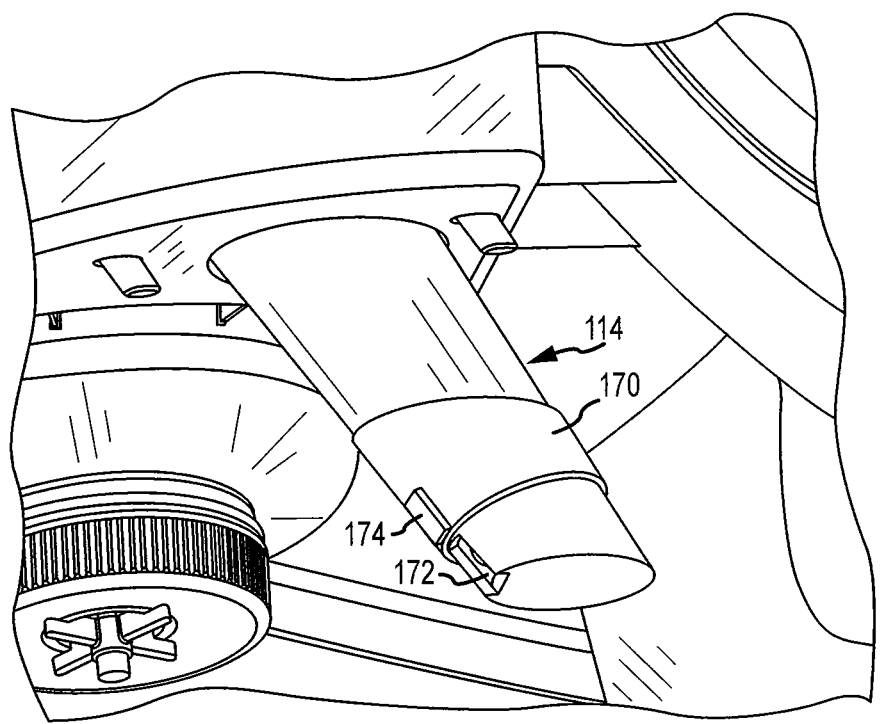
FIG. 8 depicts a perspective view of one embodiment of the water screw device illustrating a filter assembly to filter the water of the watering device.

Further, a filter may also be included in the watering device 100 to aid in removing dust, dirt, hair or any other debris that may collect in the water during operation of the watering device. For example, as shown in FIG. 8, one such filter 170 may take the form of a removable carbon based filter ring that slips over one end of the water screw assembly 114, at least partially covering the lower opening of the water screw assembly. The filter 170 may include a rail 174 that extends along the inner surface of the filter ring and engages a rail guide 172 located along the outer surface of the water screw assembly 114. The rail 174 and rail guide 172 may interact to ensure proper alignment of the filter 170 ring over the water screw assembly 114 by the user when sliding the filter ring into place.

The filtering of the water by the ring filter 170 can best be seen in FIG. 4. In the embodiment shown, the filer ring 170 at least partially covers the lower opening 138 of the water screw assembly 114 such that water flowing into the water screw assembly 114 first flows through the filter 170. In this manner, the filter may remove impurities from the water as the water flows through the filter into the water screw assembly 114 for transportation into the upper bowl 104 by the water screw 134.

Figure 9:
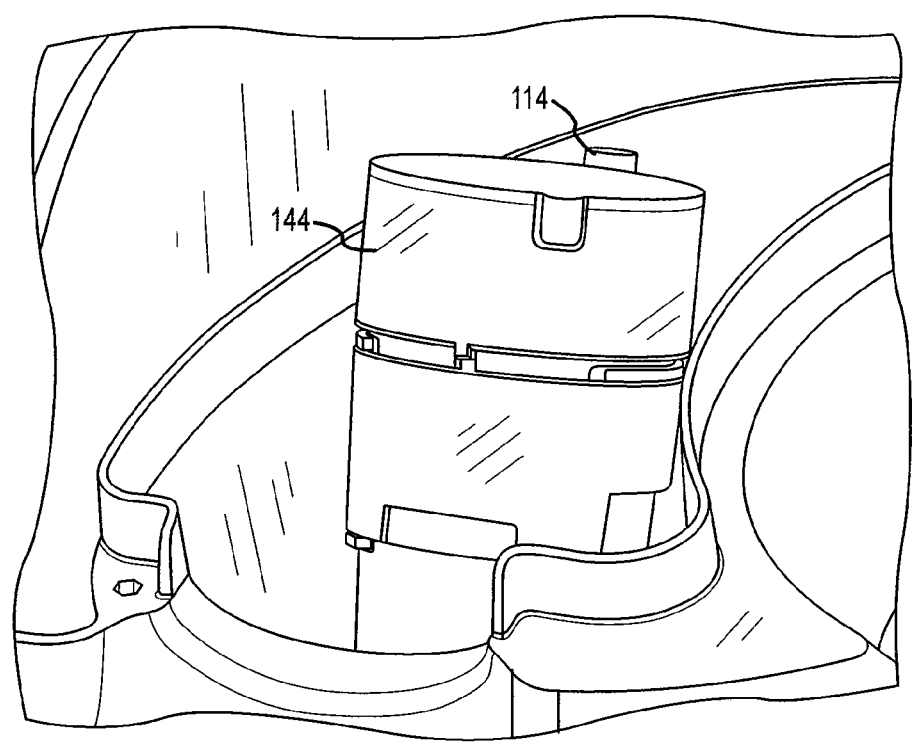
FIG. 9 depicts a perspective view of the interior view of one embodiment of the water screw device illustrating a ultraviolet light emitting diode attached to the water screw assembly to filter the water of the watering device.

As shown in FIG. 9, the watering device 100 may also include a ultra-violet germicidal remover 144 attached to the water screw assembly 114. As should be appreciated, ultra-violet (UV) light applied to water can be effective in reducing the number of viruses and bacteria that exist in the water. Thus, by applying UV radiation to the water of the watering device 100, the water may become safer and cleaner for consumption by an animal using the device.

To provide the UV radiation to the water, the UV light 144 shown in FIG. 9 may include a UV light-emitting diode (LED) light source that emits a UV light. This UV LED may be attached or otherwise coupled to the water screw assembly 114 such that the LED is placed above the water in the upper bowl 104 and shines into the water. In this position, the LED may emit UV light into the water of the upper bowl 104, providing the water with an additional filtering and cleaning mechanism. The UV filter 144 may be powered through a battery or may connect to the same power circuit powering the motor 130 of the water screw assembly 114.

Figure 10:
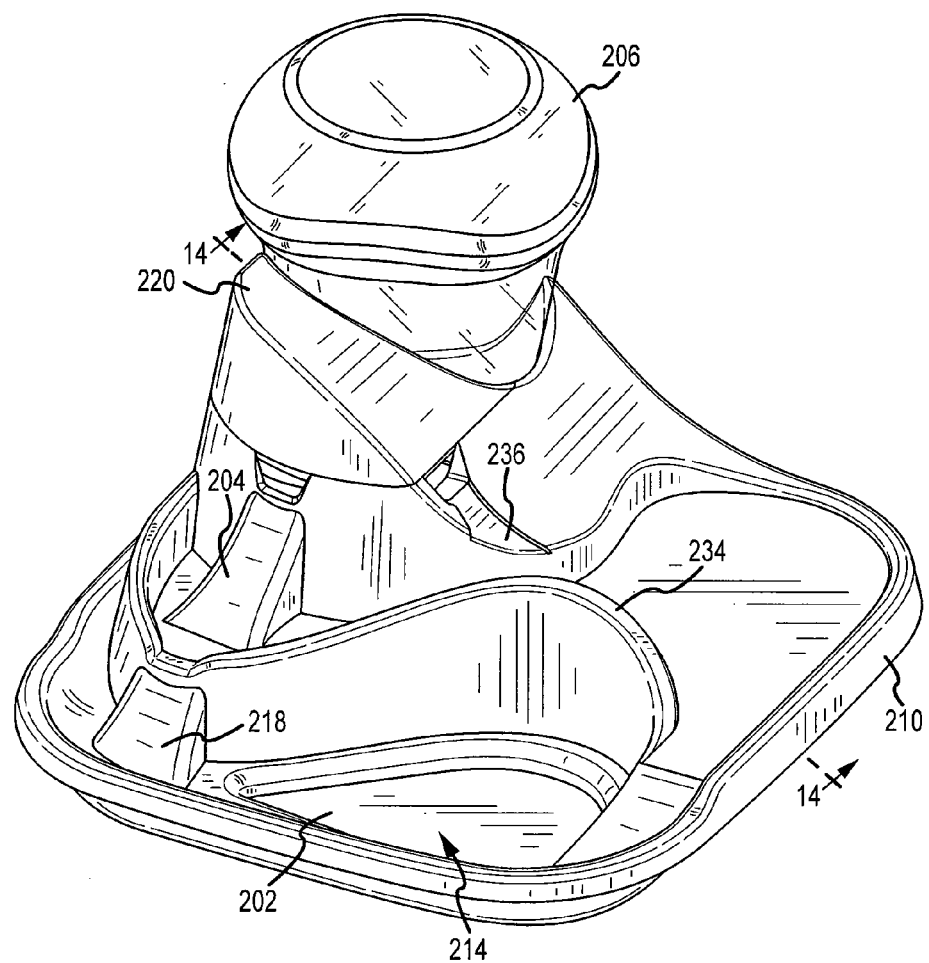
FIG. 10 depicts a perspective view of another embodiment of a watering device utilizing a water screw to create a continuous flow.
Figure 11:
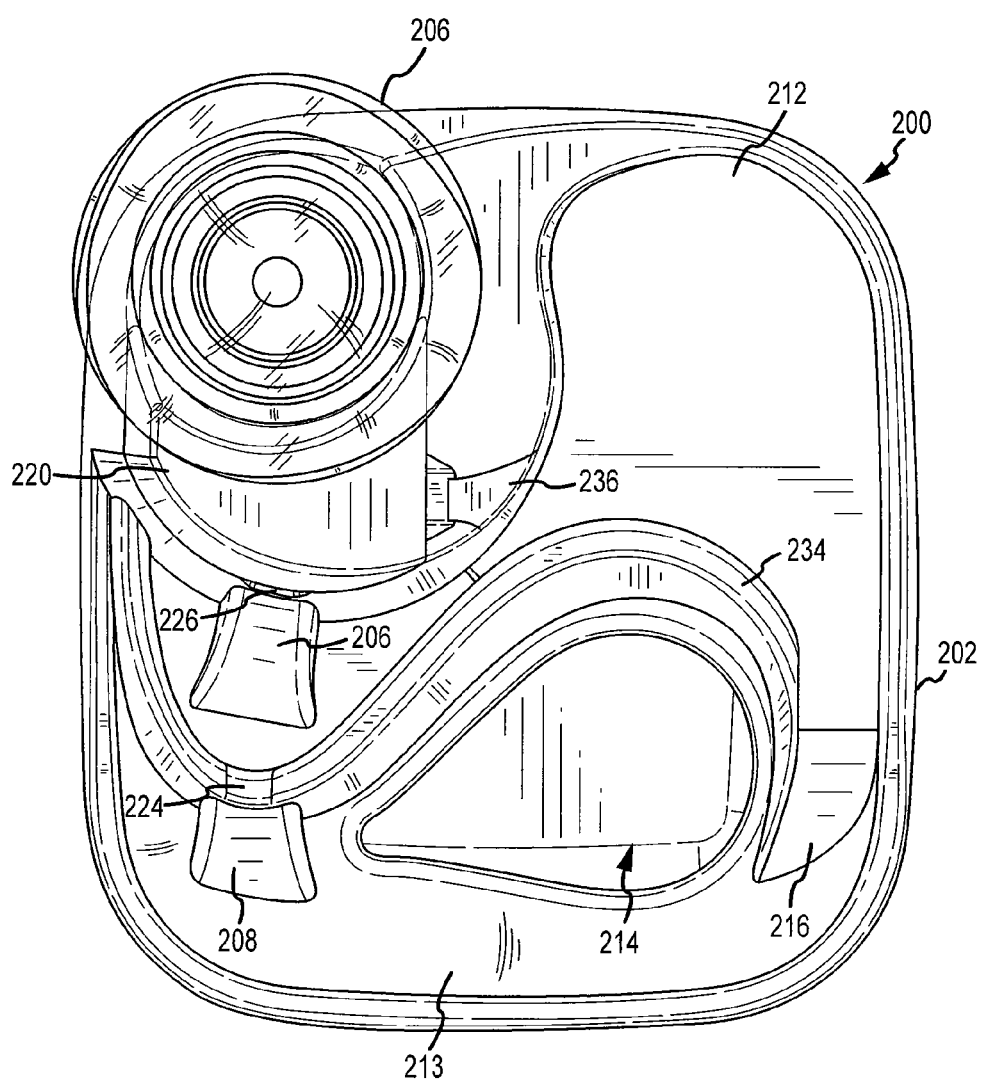
FIG. 11 depicts a top plan view of the embodiment of the watering device illustrated in FIG. 10.

FIG. 10 illustrates another embodiment of the watering device 100. As shown in FIG. 10, the watering device 200 includes an upper housing or case 210 operably attached to a lower bowl 202. The case 210 provides multiple drinking basins for animals using the watering device 200 as well as multiple fluid-flow paths. In certain embodiments, each of the multiple drinking surfaces may have multiple fluid-flow paths leading thereto. The watering device 200 also includes a water storage reservoir 206, which may be generally the same as the water storage reservoir 106 illustrated in FIG. 1, although its dimensions may be altered to accommodate the dimensional differences between the two embodiments of the watering device 100, 200 illustrated in FIG. 1, and FIG. 10, respectively. Similarly, the watering device 200 also may includes the water screw assembly 114 and UV Light 119 (see FIGS. 13 and 14) although the dimensions for each may additionally be altered to accommodate the differences in shape and/or in the watering device 200. In alternative embodiments, other apparatuses for conveying water from the reservoir 206 to the fluid-flow paths may be used instead of the water screw assembly. For example, a motorized pump may be used instead. Likewise, the UV light 119 may be omitted from certain embodiments.

The water screw assembly 114 and the UV light 119 function in the same manner, i.e. the water screw assembly 114 pulls water from the lower bowl 202 into an upper bowl 232 and the UV light 119 sterilizes the water. However, it should be noted that the watering device 200 may be used with a variety of pumps and filtering devices, and the water screw assembly 114 and UV light 119 are just one embodiment. Furthermore, the watering device 200 may also include a removable lid 220 for covering the upper bowl 232 and the water screw assembly 114.

Referring now to FIGS. 10-13, the case 210 may be removable from the lower bowl 202. For instance, in some embodiments the case 210 may snap-fit onto the lower bowl 202. In these embodiments, the case 210 may include a lip that attaches over a similarly shaped lip on the lower bowl 202. However, the case 210 and the lower bowl 202 may attach to each other in a variety of ways and in some instances the lower bowl 202 and the case 210 may be a unitary piece. For example, the case and bowl may screw together, be mated through a tongue-and-groove arrangement, have one or more tabs that are received in mating depressions, and the like.

The case 210 forms the main body of the watering device 200 and may be formed of a unitary construction or may be constructed from multiple elements. In some embodiments, the case 210 includes a water storage receiving area 230. This area 230 receives the water storage reservoir 206 and secures it to the watering device 200. To top area of the case 210 forms the upper bowl 232. The upper bowl 232 is similar to the upper bowl 104 illustrated in FIG. 4 and includes a floor 242 and securing apertures 227, 228. The water screw assembly 114 may be inserted into the main securing aperture 228 and attached to the upper bowl 232, as described with respect to FIG. 4. When the water screw assembly 114 is secured within the floor 242, the upper bowl 232 can substantially support and contain water.

As described above with respect to FIGS. 3-5, water is pumped from the lower bowl 202 to the upper bowl 232 via the water screw assembly 114. Once pumped into the upper bowl 232 the water exits onto the front surface of the case 210. The case 210 provides the drinking surfaces for animals using the watering device 200. The drinking surfaces include pooling areas 211, 212, 213, or basins. Each pooling area 211, 212, 213 may be fluidly connected to every other pooling area 211-213, allowing a variety of fluid flow paths from the upper bowl 232 back to the lower bowl 202. The pooling areas 211-213 may be a variety of different depths or may all have the same depth. In some embodiments each of the pooling areas 211-213 may have a different depth, such that the water level in each pooling area 211-213 may be different. In other embodiments, the first and second pooling areas 211, 212 may be designed to have the same water depth whereas the third pooling area 213 may have a deeper water depth.

Figure 12:
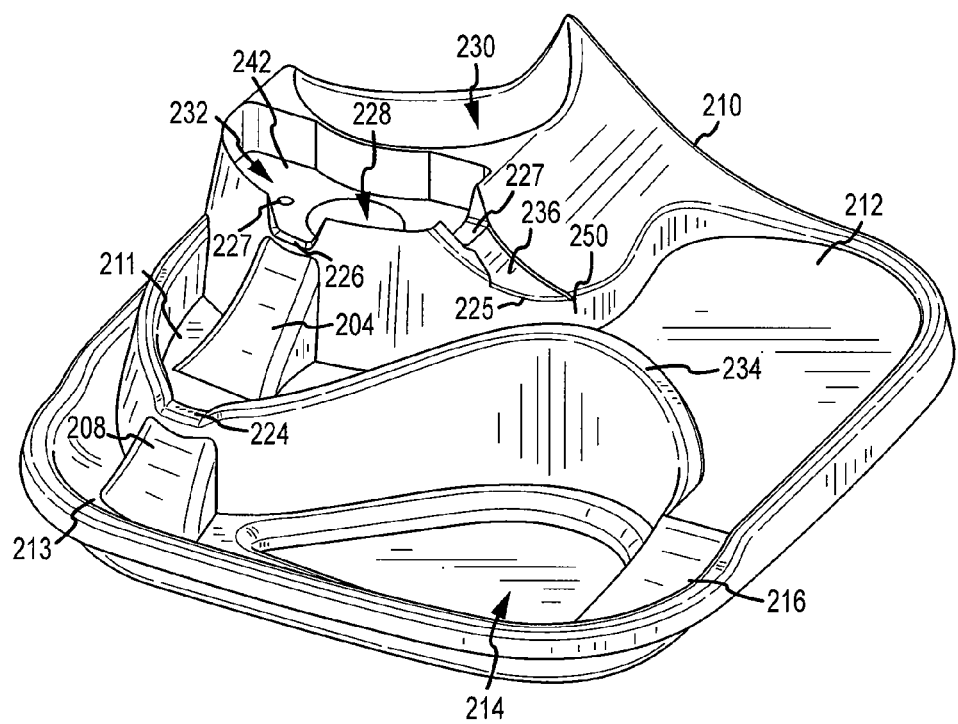
FIG. 12 depicts a perspective view of the upper case removed from the watering device illustrated in FIG. 10.

Additionally, as shown in FIG. 12, the third pooling area 213 is also connected to the lower bowl 202 via an access aperture 214 formed in the case 200. The area of the case 210 surrounding the access aperture 214 may be slightly lower than the other portions of the case 210, such that water traveling along the case 210 may travel towards the access aperture 214. The access aperture 214 fluidly connects the case 210 to the lower bowl 202, and allows the water flowing down the case 210 to be re-circulated via the water screw assembly 114. The access aperture 214 also provides an increased water depth in the third pooling area 213, as water stored in the lower bowl 202 may be accessed by the animal in the third pooling area 213.

A lower wall 234 separates the first and second pooling areas 211, 212 from the third pooling area 213. The lower wall 234 helps to direct the flow of water between the pooling areas 211-213, such that water travels along the length of the lower wall 234 and may only enter the third pooling area 213 via a cutout 224 or at the end of the lower wall 234, e.g., the second ramp 216. There are also two ramps 208, 216 fluidly connecting the first and second pooling areas 211, 212 to the third pooling area 213. The ramps 208, 216 may be generally similar to the ramp 112 in operation, but may be different in dimensions and/or shape. Additionally, in the current embodiment a wall cutout 224 is located above the first ramp 208, allowing water from the first pooling area 211 to travel over the lower wall 234, down the first ramp 208 and into the third pooling area 213. The wall cutout 224 reduces the height in the lower wall 234 and acts to funnel water flowing from the first pooling area 211 into the third pooling area 213.

In the illustrated embodiment, the lower wall 234 extends from the left side of the case 210 to the right side of the case 210, and may vary in height along its length. For example, the lower wall 234 may be lower in height at the point between the first pooling area 211 and the third pooling area 213 than at the point between the second pooling area 212 and the third pooling area 213. Furthermore, the lower wall 234 may curve to provide generally circular shapes to the pooling areas 211-213, it should be noted that the shape of the lower wall 234 and the curves may be altered to create different size and shaped pooling areas 211-213. The lower wall 234 terminates at the second ramp 216, the lower wall 234 forms a first side of the second ramp 216. The second ramp 216 fluidly connects the second pooling area 212 with the third pooling area 213. It should be appreciated that alternative embodiments may have walls, ramps, and other features of varying heights, lengths, widths, curvatures and the like. For example, one embodiment may use only straight walls and/or ramps.

The case 210 also includes an upper wall 250. The upper wall 250 separates the upper bowl 232 from the first and second pooling areas 211, 212 and additionally supports the upper body of the case 200. The upper wall 250 curves around the back end of the first and second pooling areas 211, 212 forming the back barrier between each the first and second pooling areas 211, 212. Similar to the lower wall 234, the upper wall 250 also has cutouts 225, 226. The cutouts 225, 225 fluidly connect the upper bowl 232 to the second and first pooling areas 212, 211, respectively. The front cutout 226 fluidly connects the upper bowl 232 with the front ramp 204. The front ramp 204 provides a path for water to flow from the reservoir into the first pooling area 211. The lower face cutout 225 fluidly connects the upper bowl 232 with the second pooling area 212 via the face ramp 236.

The upper bowl 232 is similar to the upper bowl 104, illustrated in FIG. 2, but instead of one exit aperture, may include multiple exit apertures. The upper bowl 232 is fluidly connected to the lower bowl 202 via the water screw assembly 114, and is filled with water from the lower bowl 202. When the upper bowl 232 fills with water, the water exits the upper bowl 232 via the front cutout 226 and/or the top face cutout 227. Generally, water flows over the two cutouts 226, 227 and onto the front ramp 204 and the face ramp 236. The front ramp 204 leads directly into the first pooling area 211 and the face ramp 236 flows over the lower face cutout 225 into the second pooling area. As with ramps 208, 216. The front and face ramps 204, 236 may be shaped similarly to the ramp 116, but includes varying dimensions and/or shapes.

Figure 13:
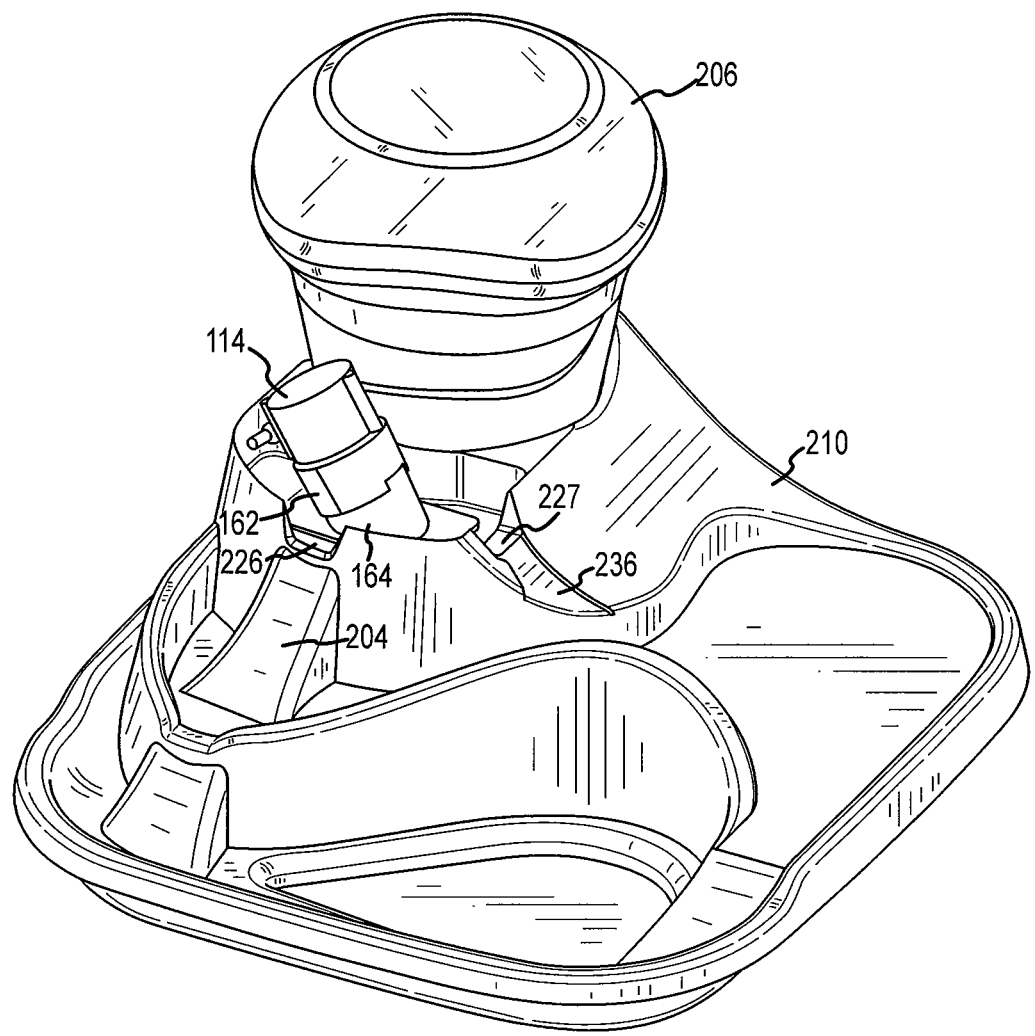
FIG. 13 depicts the embodiment of the watering device illustrated in FIG. 10 with the lid removed.
Figure 15:
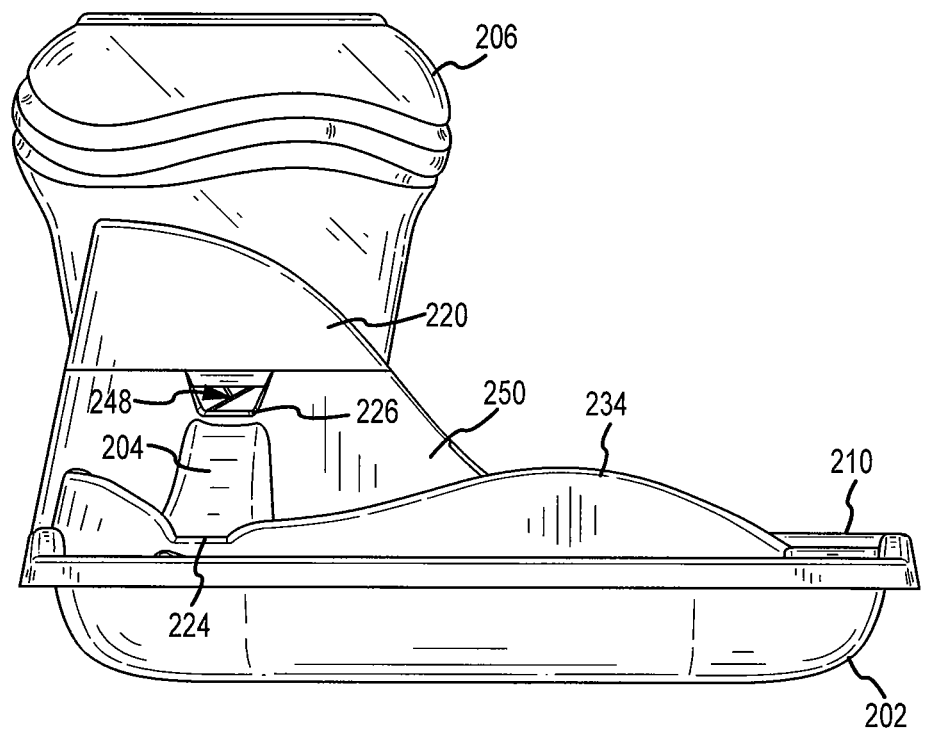
FIG. 15 illustrates a front elevation view of the embodiment of the watering device illustrated in FIG. 10.
Figure 16:
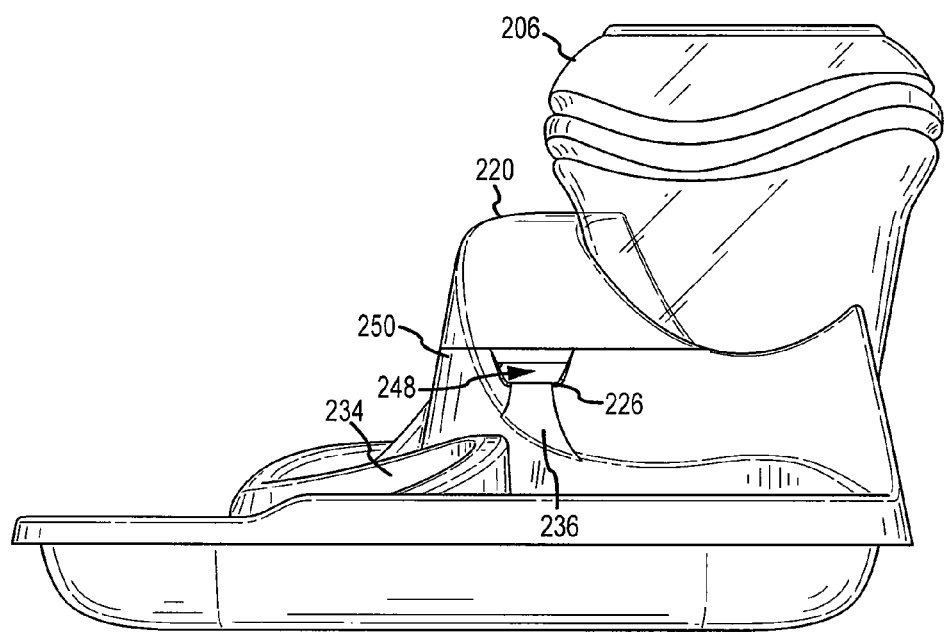
FIG. 16 illustrates a right side elevation view of the embodiment of the watering device illustrated in FIG. 10.

As shown in FIGS. 15 and 16, when the removable lid 220 is installed over the upper bowl 232, the cutouts 226, 227 form apertures as the lid 220 sits on the top of the upper surface of the upper wall 250 but does not cover the cutouts 226, 227. The removable lid 220 covers the upper bowl 232 and the water screw assembly 114. This may provide an appealing aesthetic appearance, as well as substantially prevent animals from accessing the upper bowl 232. For example, as shown in FIG. 13, when the removable lid 220 is removed, the water screw assembly 114 and upper bowl 232 are exposed. Thus, the removable lid may prevent animals from accessing or interfering with the operation of the water screw assembly 114.

Figure 14:
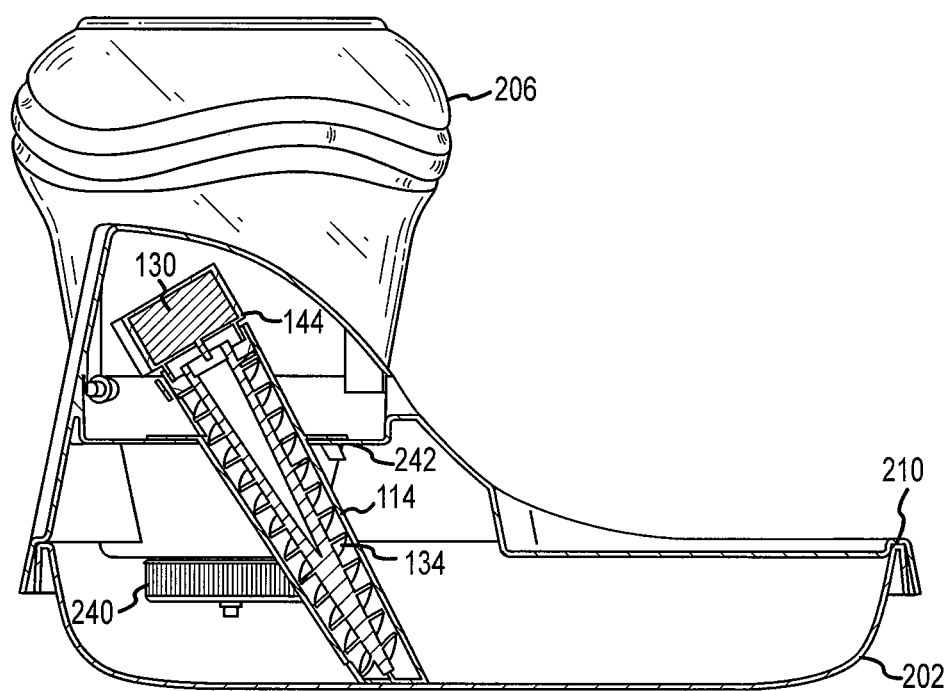
FIG. 14 depicts a cross-section of the watering device viewed along line 14-14 in FIG. 10, illustrating an interior view of the water screw assembly.

Referring to FIGS. 10 and 14, the water storage reservoir 206 is attached to the case 202 and received in the water storage receiving area 230. The water storage reservoir 206 is used to store water and hovers slightly above the bottom floor of the lower bowl 202. Additionally, at the lower end of the water storage reservoir 230 a cap 240 may be attached. The cap 240 may include or incorporate a filter to filter the water as it flows between the water reservoir 206 and the lower bowl 202. Alternately or in addition, the cap may include a valve for regulating water flow between the two.

Continuing to refer to FIGS. 10 and 14, in operation the lower bowl 202 is filled with water. Water may flow from the water reservoir 206 to the lower bowl 202 to fill it, or a user may directly fill the lower bowl 202 (through removing the case 210 or through the access aperture 214). Once the lower bowl 202 is filled and when the water screw assembly 114 is activated, the water screw assembly 114 pulls water from the lower bowl 202 to the upper bowl 232. This is discussed in more detail with regard to FIG. 4. The water screw 134 pulls water from the lower bowl 202 into the upper bowl 232, and once in the upper bowl 232 the UV light 119 (if included) shines on the water helping to kill bacteria and the like. Once the water level in the upper bowl 232 reaches the height of the front cutout 226 and the face cutout 227, it flows down either or both of the front ramp 204 or the face ramp 236, respectively. It should be noted that the water may flow in either direction and through either the face cutout 227 or the front cutout 226 as the cutouts 226, 227 may be located at the same height from the floor 242 of the upper bowl 232.

The water exiting the upper bowl 232 via the front cutout 226 flows down the front ramp 206. This ramp 206 leads to the first pooling area 211 and the water may pool in this area 211. Once the water level in the first pooling area 211 reaches the height of the first cutout 224, the water travels over the first cutout 224 and down the first ramp 208 into the third pooling area 213. However, in some instances the water may travel along the surface of the first pooling area 211 to reach the second pooling area 212, depending on the amount of water deposited in the first pooling area 211.

The water exiting the upper bowl 232 via the face cutout 227 flows down the face ramp 236, over the lower face cutout 225 and into the second pooling area 212. Once in the second pooling area 212 the water may travel down the second ramp 216 into the third pooling area 213 or directly into the first pooling area 211. Also, the second pooling area 212 may be slightly deeper than the area surrounding it and cause water to pool until the water reaches a predetermined level, before flowing into the other pooling areas 211, 213. Once water has entered the third pooling area 213, from either the first ramp 208 or the second ramp 216, the water may flow into the lower bowl 202 via the access aperture 214.

It should noted that at any of the pooling areas 211-213 and the access aperture 214 an animal may drink water, as the water will be gathered into a partially enclosed area. As the water is partially enclosed and the bottom surfaces of the pooling areas 211-213 may be slightly lower than the surrounding areas, the water creates pools. This is because the depressed areas cause the water to pool until the level reaches a predetermined level (depending on the depth of the pooling area 211-213). The pools provide a drinking area for animals, and as the water continues to circle from between the pooling areas 211-213 and the upper bowl 232, the water is continuously circulated. Additionally, the water is continuously filtered via the filter ring 170 on the water screw assembly 114 and disinfected via the UV light 119. This allows the water to be cleaner and helps prevent the growth of bacteria and the like in the water. Furthermore, the continuous flow down the ramps 206, 208, 216, 236 creates a fountain-like aesthetic appearance and/or sound depending on the flow rate from the upper bowl 232 (via the water screw assembly 114).

Generally, the components of embodiments of the watering device 100, 200 described above may be constructed using a lightweight water resistant plastic material and may be most preferably formed by injection molding, except where explicitly stated otherwise. The water storage reservoirs 116, 206 may be preferably blow molded and fabricated from a translucent or clear plastic material to allow the water level to be observed while mounted on the watering device.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

What is claimed is:

1. A continuous watering device for animals, comprising:
   a lower bowl structured for holding water and configured to allow an animal to drink therefrom;
   an upper bowl positioned vertically above the lower bowl and configured to hold water no higher than a predetermined level determined by a lip located at an edge of the upper bowl;
   a ramp disposed between the upper bowl and the lower bowl and configured to enable movement of water from the upper bowl toward the lower bowl; and
   a water screw assembly structured for transporting water from the lower bowl toward the upper bowl, the water screw assembly including a motor disposed above the predetermined level determined by the lip,
   wherein the water screw assembly includes an upper opening configured to allow water to exit the water screw assembly into the upper bowl,
   wherein the water screw assembly includes a flow control device including a plurality of apertures having different sizes, and
   wherein the flow control device is structured to be rotated to align a selected one of the plurality of apertures with the upper opening to limit an amount of water allowed to exit the water screw assembly into the upper bowl.

2. The continuous watering device for animals of claim 1, wherein the water screw assembly comprises:
   a water screw; and
   a hollow body at least partially encasing the motor and the water screw,
   wherein the motor is configured to rotate the water screw.

3. The continuous watering device for animals of claim 2 wherein the water screw assembly further comprises: one or more helical ridges that wrap around at least a portion of the water screw, wherein the helical ridges and interior of the hollow body act on the water to transport the water from the lower bowl to the upper bowl.

4. The continuous watering device for animals of claim 1 wherein the water screw assembly further comprises:
   a lower opening configured to allow water to enter the water screw assembly from the lower bowl.

5. The continuous watering device for animals of claim 1 wherein the lower bowl comprises:
   a first container;
   a second container; and
   one or more openings in at least one of the first container and the second container configured such that water flows between the first container and the second container.

6. The continuous watering device for animals of claim 1 further comprising a water storage reservoir in fluid communication with the lower bowl.

7. The continuous watering device for animals of claim 4 further comprising a filter configured to at least partially cover the lower opening of the water screw assembly.

8. The continuous watering device for animals of claim 1 further comprising an ultra-violet germicidal device comprising an ultra-violet light emitting device disposed on the water screw assembly.

9. The continuous watering device for animals of claim 1 wherein the water screw assembly is disposed between the lower bowl and the upper bowl.

10. The continuous watering device for animals of claim 1 wherein the ramp comprises an arcuate channel disposed between the upper bowl and the lower bowl that is structured to promote smooth water flow as the water travels from the upper bowl toward the lower bowl.

11. The continuous watering device for animals of claim 10 wherein the ramp is configured to slope upward from the lower bowl and follows an arcuate contour of the lower bowl.

12. The continuous watering device for animals of claim 1 further comprising a pair of handles disposed on the bottom of the watering device.

13. The watering device of claim 1, wherein the plurality of apertures have rectangular shapes with different heights.

14. The watering device of claim 1, wherein the water screw assembly includes one or more grooves, wherein the flow control device includes one or more nubs structured to interact with the one or more grooves.

15. A system for a continuously flowing watering device with reduced electrocution hazard, comprising:
   a lower bowl configured to hold water,
   an upper bowl disposed above the lower bowl and configured to hold water no higher than a predetermined level determined by a lip disposed at the edge of the upper bowl;
   a water screw assembly disposed between the lower bowl and the upper bowl, the water screw assembly comprising a motor operably attached to a water screw such that activation of the motor causes the water screw to rotate and transport water from the lower bowl toward the upper bowl, wherein the motor is disposed above the predetermined level to reduce the electrocution hazard of the watering device; and
   a ramp disposed between the upper bowl and the lower bowl and configured to support a stream of water as the water moves from the upper bowl toward the lower bowl,
   wherein the water screw assembly includes an upper opening configured to allow water to exit the water screw assembly into the upper bowl,
   wherein the water screw assembly includes a flow control device including a plurality of apertures having different sizes, and
   wherein the flow control device is structured to be rotated to align a selected one of the plurality of apertures with the upper opening to limit an amount of water allowed to exit the water screw assembly into the upper bowl.

16. The system of claim 15 further comprising a water storage reservoir in fluid communication with the lower bowl.

17. The system of claim 15 further comprising a filter configured to filter the water.

* * * * *